Figure 8:
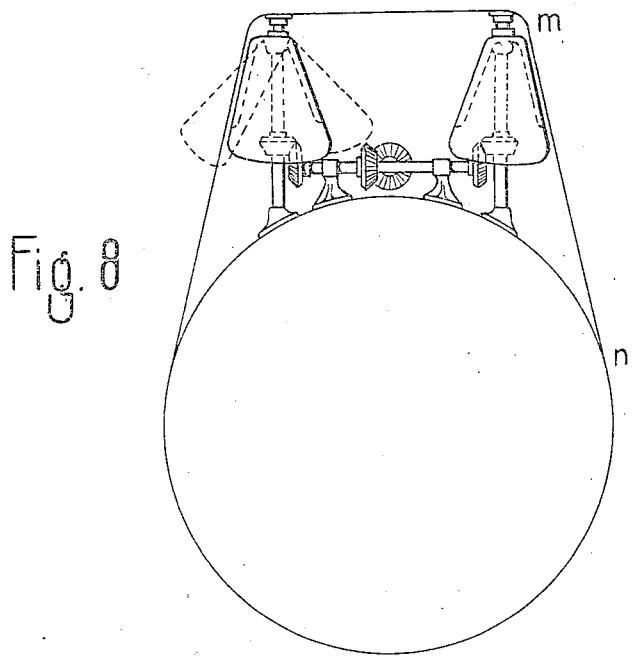

C. LAURENTI.
RUDDERS FOR THE SUBMERSION AND THE NAVIGATION OF SUBMARINE VESSELS UNDER WATER.
APPLICATION FILED OCT. 14, 1910.
1,061,088.
Patented May 6, 1913.
5 SHEETS—SHEET 1.
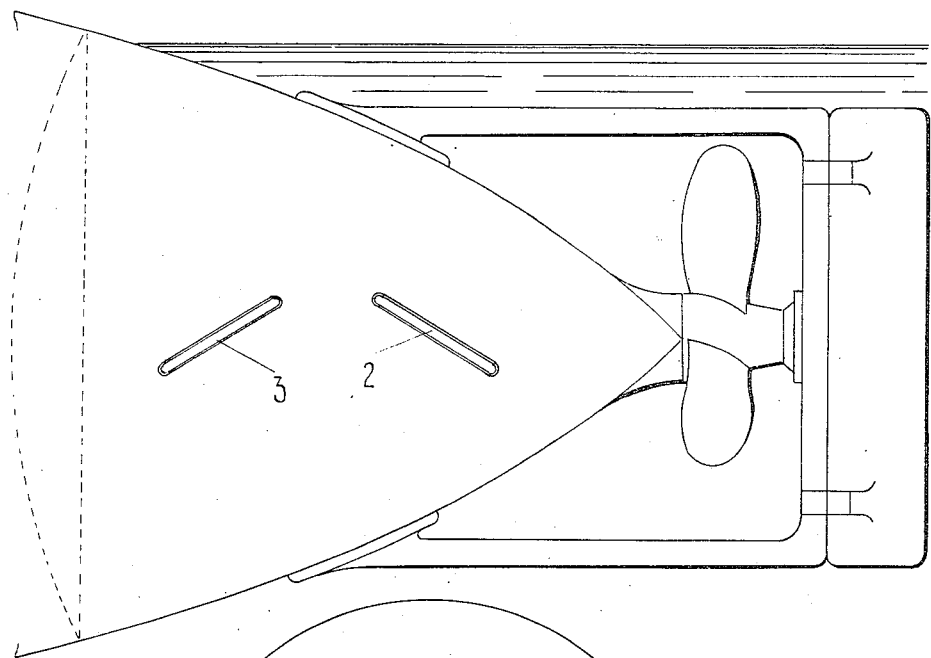
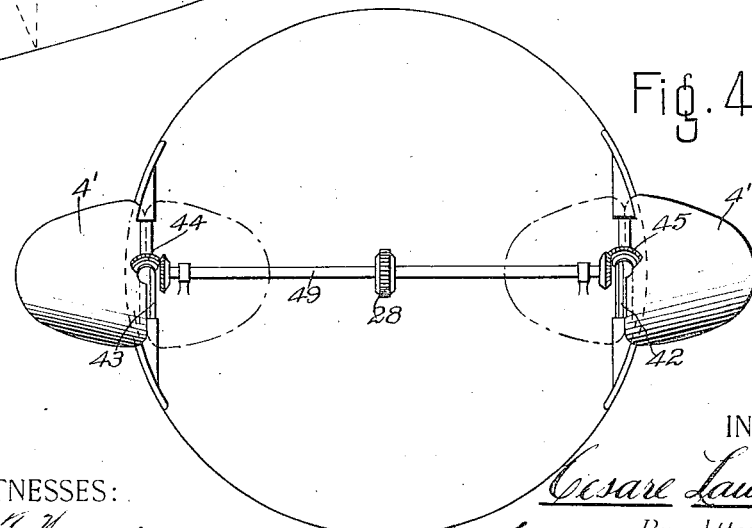

C. LAURENTI.
RUDDERS FOR THE SUBMERSION AND THE NAVIGATION OF SUBMARINE VESSELS UNDER WATER.
APPLICATION FILED OCT. 14, 1910.
1,061,088.
Patented May 6, 1913.
5 SHEETS—SHEET 2.
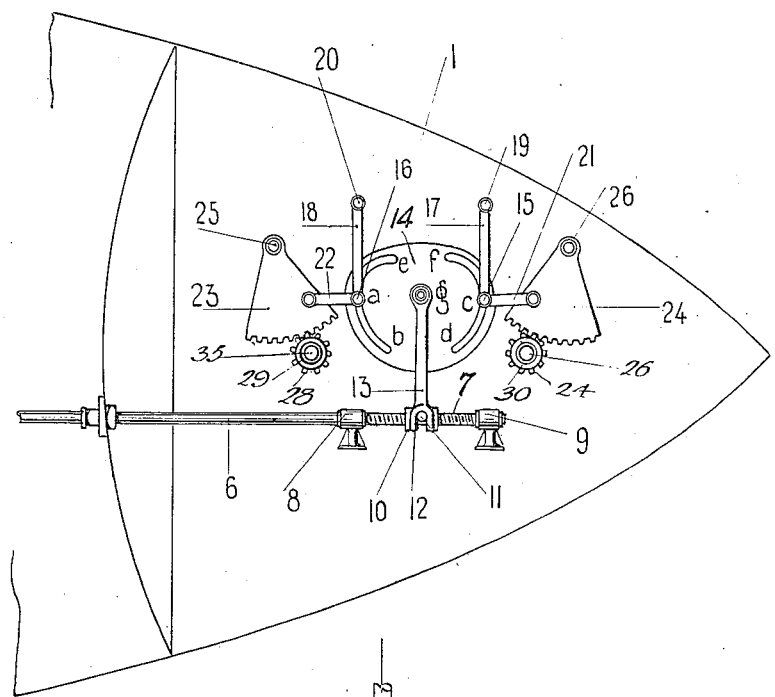
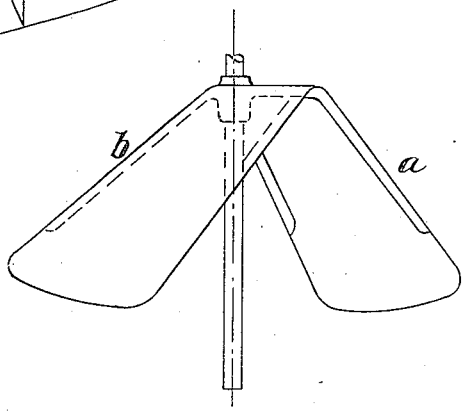
WITNESSES:
INVENTOR
Cesare Laurenti,
By Attorneys, C. LAURENTI.
RUDDERS FOR THE SUBMERSION AND THE NAVIGATION OF SUBMARINE VESSELS UNDER WATER.
APPLICATION FILED OCT. 14, 1910.
1,061,088.
Patented May 6, 1913.
5 SHEETS—SHEET 3.
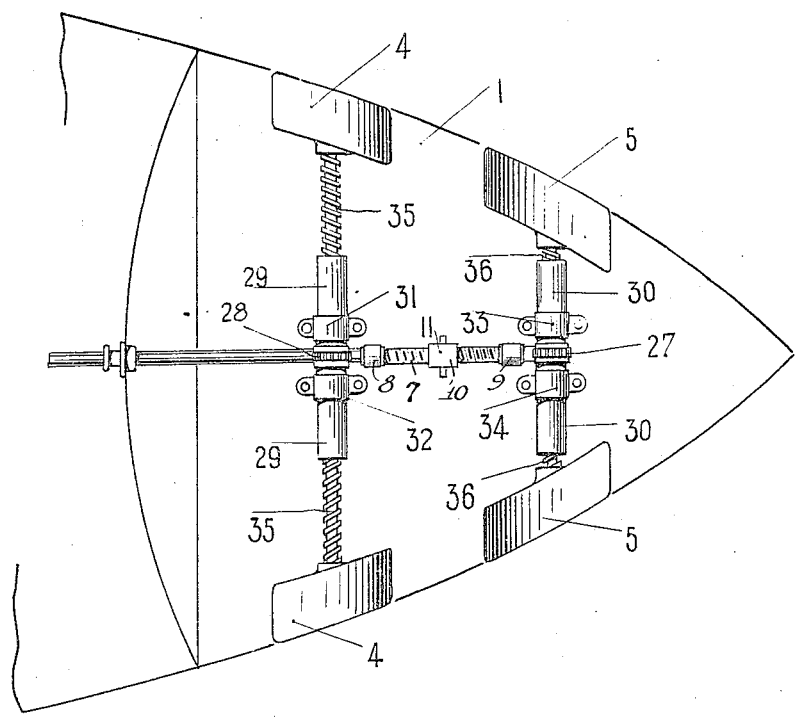
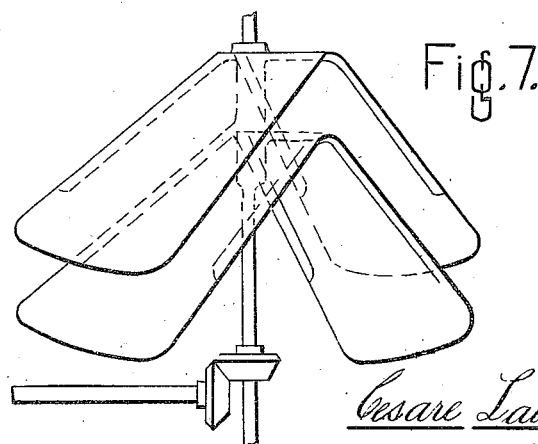
WITNESSES:
INVENTOR
Cesare Laurenti,
By Attorneys,

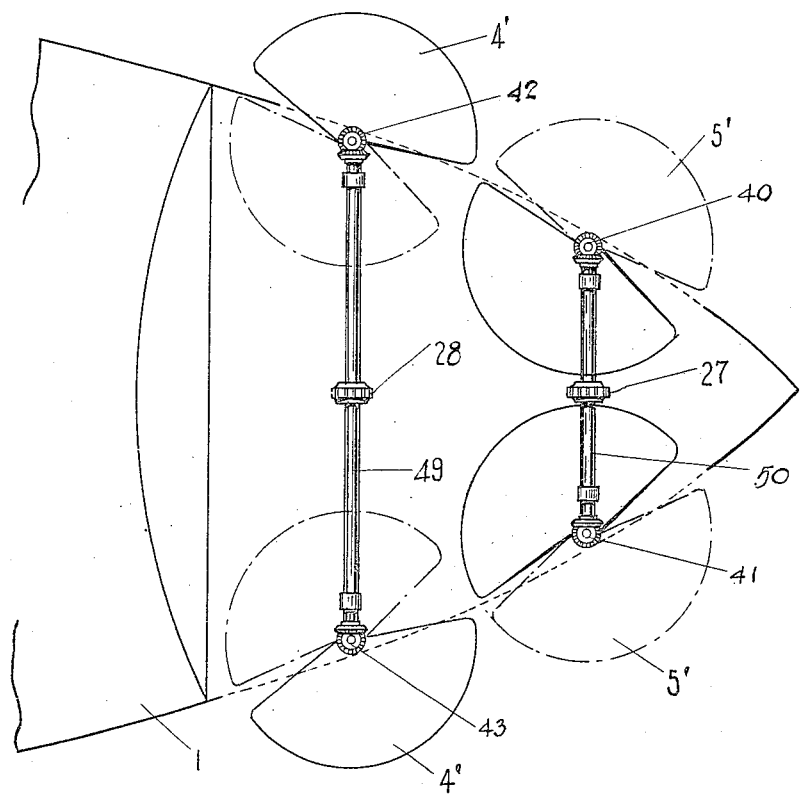

UNITED STATES PATENT OFFICE.

CESARE LAURENTI, OF SPEZIA, ITALY, ASSIGNOR TO FIAT-SAN GIORGIO, SOCIETÀ ANONIMA, OF SPEZIA, ITALY.

RUDDERS FOR THE SUBMERSION AND THE NAVIGATION OF SUBMARINE VESSELS UNDER WATER.

1,061,088.  Specification of Letters Patent.  Patented May 6, 1913.

Application filed October 14, 1910. Serial No. 587,042.

*To all whom it may concern:*

Be it known that I, CESARE LAURENTI, engineer, of Spezia, Italy, have invented certain new and useful Improvements in or Relating to Rudders for the Submersion and the Navigation of Submarine Vessels Under Water, of which the following is a full, clear, and exact specification.

The subject of the present invention is an improvement in rudders for the submersion of submarine vessels, the employment of which obviates many of the inconveniences experienced with the rudders at present in use.

The rudders in use at present are attached externally to the hull of the submarine, and are fixed on their axis of rotation or are pliable. In the former case they are evidently exposed to injury by a rough sea, in consequence of the rolling or pitching of the vessel; and they also increase the resistance to the movement of the vessel while being navigated on the surface. In the second case if they are above the water line they do not present the inconvenience of increasing the resistance movement during navigation on the surface but they are liable to injury, though less so than the fixed rudders, while they have the additional inconvenience of requiring a long time to prepare before they are ready for submerging the submarine. As is well known, the working of these rudders is based on the variations of their angle relative to the direction of movement. The rudders forming the subject of this invention are, on the contrary, mounted in a fixed angle of inclination and are of the disappearing type, that is to say they are adapted to be withdrawn completely within the hull at any desired time and are ready to be protruded to the requisite extent when necessary. It is evident that by adopting an arrangement of this kind, the rudders are less liable to become injured and furthermore, since they can be kept withdrawn within the hull, they do not offer any resistance to the movement of the vessel while being navigated at the surface.

In the accompanying drawings: Figure 1 is an elevation of the stern of a submarine vessel provided with rudders arranged in accordance with this invention; Fig. 2 is a longitudinal vertical section of Fig. 1. Fig. 3 is a transverse section of Fig. 1; Fig. 4 is a sectional end view of a submarine vessel showing a modification; Fig. 5 is a transverse section of Fig. 4 and Figs. 6, 7, 8 and 9 show other modifications.

If desired the rudders can evidently be applied in a perfectly analogous manner to the prow of the vessel.

As will be seen from Fig. 1, slits 2 and 3 are pierced on two flanks of the hull 1 of the submarine, the slope of these slits being such that the angle which they make with the horizontal may give the maximum useful effect. In these slits are housed two pairs of rudders 4 and 5 (Fig. 3) of which only the pair 4 is protruded from the vessel when the latter is desired to emerge, while conversely only the pair 5 will be protruded—the pair 4 being kept concealed—when the vessel is to dive. By regulating the extent to which one or other pair of rudders is protruded, according to circumstances, the effect can be varied, according to requirements, at will.

The mechanism operating the horizontal sliding of the pairs of rudders 4 and 5 is as follows (see Figs. 2 and 3). The shaft 6 which extends to the rudder-operating chamber terminates in a thread 7 and is carried by supports 8 and 9 secured to the hull. On this thread is a nut 10 provided with pivots 11 which engage in the fork 12 of the arm 13 which latter, is free to turn about the pivot $g$ secured to the hull. By causing the nut to move to the right or left, according to the direction of rotation of the shaft 6, the arm 13 is compelled to undergo displacement to the right or left. The arm 13 is rigidly connected with a disk 14 in which are pierced two symmetrical slits $e\ a\ b$ and $f\ c\ d$, the portions $a\ b$ and $c\ d$ of these being circular and centered on $g$ the center of rotation of the disk 14—while the portions $a\ e$ and $c\ f$ approach rapidly toward the center $g$. In these two slits there engage two studs 15 and 16 which connect the ends of the bars 17 and 18 rotating about the points 19 and 20 secured to the hull, and also the ends of the rods 21 and 22 articulated on the circular toothed quadrants 23 and 24, which rotate about points 25 and 26 also secured to the hull. The two circular quadrants 23 and 24 engage with the two pinions 27 and 28 which are rigidly connected with the threaded sleeves 29 and 30 (Fig. 3) carried by the supports 31—32, 33—34 secured to the hull. Through these sleeves pass the threaded shafts 35 and 36 carrying the rudders 4 and 5. The ratio between the toothed quadrants 23 and 24 and the wheels 27, 28 is such that a relatively small movement of the quadrants causes the pinions to make two or more complete revolutions; and the pitch of the threads on the shafts 35, 36 and the corresponding nuts 29, 30 is very rapid, so that a slight rotation of the disk 14 results in the complete protrusion of the rudders from the hull of the submarine.

The mode of operating is as follows: The vertical position of the arm 13 corresponds to the complete withdrawal of the two pairs of rudders, but when the arm is moved, for instance, toward the right in consequence of the rotation of the shaft 6, the stud 15 is not displaced, since it slides in the portion $c\ d$ of the slit which is concentric with relation to the point $g$; while on the other hand the stud 16 is drawn toward the point $g$, and consequently the wheel 28 will turn, and the pair of rudders 4 is pushed quickly out of the hull. Similarly when the arm 13 turns to the left, the pair of rudders 5 is pushed outward, while on the other hand the pair 4 remains withdrawn inside the corresponding slit 3.

By adopting another arrangement, as shown in Figs. 4 and 5, the advantage is obtained, over the one just described, of requiring slits only about half as long as the foregoing, since excessive length of the slits may affect the rigidity of the hull. The operating mechanism is similar to that of the preceding case, the only difference being due to the fact that the rudders, instead of being protruded from the hull by a sliding movement issue by a rotatory movement. With this object the pinions 27 and 28 (Figs. 4 and 5) are keyed on plain shafts 49 and 50 which transmit a movement of rotation to the shafts 40, 41, 42, 43, by means of the pairs of bevel pinions 44, 45. The pairs of rudders 4' and 5' are rigidly connected with these shafts and the plane, in which they move, is inclined to the horizontal to give the angle of maximum efficiency so that when, in consequence of the rotation of the shafts 49 and 50 and the shafts 40, 41, 42, 43, the pairs of rudders are moved out of the hull inclined at the desired angle as in the previous case.

The preceding arrangement necessitates two pairs of rudders at the bow and two pairs at the stern, for navigation. By the adoption of rotary rudders the same end may be achieved in reducing the two pairs of rudders to only one by applying to the same axis of rotation not merely a single inclined surface but two inclined surfaces as shown in Fig. 6. If this special rudder placed in the flank of the wall $m\ n$ (Fig. 8) of the structure, for instance in the bow of a submarine, be turned so that the surface $a$ protrudes from the wall $m\ n$, then this surface will cause the submarine to dive in advancing, while if turned in the opposite direction, so that the surface $b$ projects from the hull of the submarine, the vessel will tend to emerge. If the two surfaces $a$ and $b$ were turned upward, in place of downward, the effect would be reversed. If it were desired to increase the active surface of the rudders without adding to the size, double rudders, as shown in Fig. 7, might be used.

Figure 9:
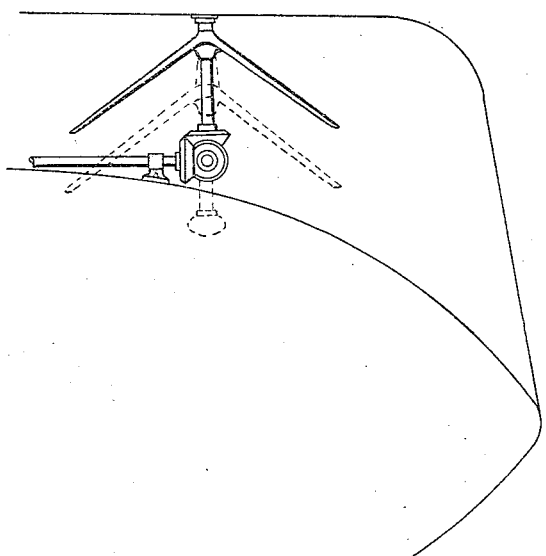

The Figs. 8 and 9 show the simple mechanism for transmitting motion to these rudders from the central operating station.

What I claim is:

1. A submergible vessel, comprising a hull and a depth controlling rudder having a fixed angle of inclination less than a right angle from a horizontal plane, said rudder being adapted to be drawn within or protruded out of said hull.

2. A submergible vessel, comprising a hull and a depth controlling rudder having a fixed angle of inclination less than a right angle from a horizontal plane, and means for moving said rudder within or protruding it from said hull.

3. A submergible vessel, comprising a hull and depth controlling rudders on each side thereof, said rudders having fixed angles of inclination less than a right angle from a horizontal plane, and being adapted to be simultaneously drawn within or protruded out of said hull.

4. A submergible vessel, comprising a hull and depth controlling rudders on each side thereof, said rudders having fixed angles of inclination less than a right angle from a horizontal plane, and means for simultaneously moving said rudders within or protruding them from said hull.

5. A submergible vessel, comprising a hull, and an emergence and a submergence rudder on each side thereof, said rudders having fixed angles of inclination less than a right angle from a horizontal plane, and being adapted to be drawn within or protruded out of said hull.

6. A submergible vessel, comprising a hull, and an emergence and a submergence rudder on each side thereof, said rudders having fixed angles of inclination less than a right angle from a horizontal plane, and means for moving said rudders within or protruding them from said hull.

7. A submergible vessel, comprising a hull, and an emergence and a submergence rudder on each side thereof, said rudders having fixed angles of inclination, and means for simultaneously moving either pair of rudders within or protruding them out of said hull.

8. A submergible vessel, comprising a hull and a depth controlling rudder having a fixed angle of inclination less than a right angle from a horizontal plane and being rotatably mounted on a vertical shaft, said rudder being adapted to be drawn within or protruded out of said hull.

9. A submergible vessel, comprising a hull and a depth controlling rudder having a fixed angle of inclination less than a right angle from a horizontal plane and being rotatably mounted on a vertical shaft, and means for moving said rudder within or protruding it from said vessel.

10. A submergible vessel, comprising a hull and depth controlling rudders on each side thereof, said rudders having fixed angles of inclination and being rotatably mounted on a vertical shaft, and means for simultaneously moving said rudders within or protruding them from said hull.

11. A submergible vessel, comprising a hull, and an emergence and a submergence rudder on each side thereof, said rudders having fixed angles of inclination, and being rotatably mounted on a vertical shaft, and means for moving said rudders within or protruding them from said hull.

12. A submergible vessel, comprising a hull, and an emergence and a submergence rudder on each side thereof, said rudders having fixed angles of inclination, and being rotatably mounted on a vertical shaft, and means for moving either said emergence or submergence rudders within or protruding them from said hull.

13. A submergible vessel, comprising a hull, and an emergence and a submergence rudder on each side thereof, said rudders having fixed angles of inclination, and being rotatably mounted on a vertical shaft, and means for simultaneously moving either said emergence or submergence rudders within or protruding them from said hull.

14. A submergible vessel, comprising a hull and an emergence and a submergence rudder on each side thereof, a single rotatable vertical shaft on each side of the vessel on which both said rudders on each side of the vessel are mounted, said rudders having fixed angles of inclination and being adapted to be drawn within or protruded out of said hull.

15. A submergible vessel, comprising a hull and an emergence and a submergence rudder on each side thereof, said rudders having fixed angles of inclination, a single rotatable vertical shaft on each side of the vessel on which both said rudders on each side of the vessel are mounted, said rudders having fixed angles of inclination, and means for moving said rudders within or protruding them from said hull.

16. A submergible vessel, comprising a hull and an emergence and a submergence rudder on each side thereof, said rudders having fixed angles of inclination, a single rotatable vertical shaft on each side of the vessel on which both said rudders on each side of the vessel are mounted, said rudders having fixed angles of inclination, and means for moving either said emergence or submergence rudders within or protruding them from said hull.

17. A submergible vessel, comprising a hull and an emergence and a submergence rudder on each side thereof, said rudders having fixed angles of inclination, a single rotatable vertical shaft on each side of the vessel on which both said rudders on each side of the vessel are mounted, said rudders having fixed angles of inclination, and means for simultaneously moving said rudders within or protruding them from said hull.

In witness whereof, I have hereunto signed my name in the presence of two subscribing witnesses.

CESARE LAURENTI.

Witnesses:
 ANGELO DORAGNIO,
 C. W. FERRARI.